(12) United States Patent
Baier et al.

(10) Patent No.: US 7,498,956 B2
(45) Date of Patent: Mar. 3, 2009

(54) APPARATUS AND METHOD FOR INPUTTING INFORMATION

(75) Inventors: Brent Michael Baier, Lloydminster (CA); Leslie Howard Messmer, Lloydminster (CA)

(73) Assignee: Iron Will Creations, Inc., Llyodminster, Saskatchewan (CA)

( * ) Notice: Subject to any disclaimer, the term of this patent is extended or adjusted under 35 U.S.C. 154(b) by 340 days.

(21) Appl. No.: 11/326,029

(22) Filed: Jan. 4, 2006

(65) Prior Publication Data

US 2007/0164878 A1 Jul. 19, 2007

(51) Int. Cl.
*H03M 11/00* (2006.01)
(52) U.S. Cl. .................. 341/20; 345/156; 345/158; 715/863
(58) Field of Classification Search ................. 345/156, 345/157, 158; 715/701, 702, 863; 341/20; 702/182
See application file for complete search history.

(56) References Cited

U.S. PATENT DOCUMENTS

| | | | |
|---|---|---|---|
| 4,414,537 A * | 11/1983 | Grimes | 341/20 |
| 6,128,004 A | 10/2000 | McDowall et al. | |
| 6,141,643 A | 10/2000 | Harmon | |
| 6,885,316 B2 | 4/2005 | Mehring | |
| 7,012,593 B2 * | 3/2006 | Yoon et al. | 345/156 |
| 2003/0026170 A1 | 2/2003 | Yang | |
| 2003/0056278 A1 | 3/2003 | Kuo et al. | |
| 2003/0179178 A1 | 9/2003 | Zargham | |
| 2004/0036678 A1 | 2/2004 | Zngf | |
| 2004/0051694 A1 | 3/2004 | Backman et al. | |
| 2004/0210166 A1 | 10/2004 | Soh et al. | |
| 2004/0263358 A1 | 12/2004 | Madsen et al. | |
| 2005/0052291 A1 | 3/2005 | Backman et al. | |
| 2005/0052412 A1 * | 3/2005 | McRae et al. | 345/158 |
| 2006/0248478 A1 * | 11/2006 | Liau | 715/863 |

FOREIGN PATENT DOCUMENTS

| | | |
|---|---|---|
| EP | 1034468 | 9/2001 |
| EP | 1517223 A1 | 3/2005 |

(Continued)

OTHER PUBLICATIONS

"The Fitaly One-Finger Keyboard", textware solutions, 1996. Website: www.fitaly.com/fitaly/backgrd.htm.

(Continued)

*Primary Examiner*—Timothy Edwards, Jr.
(74) *Attorney, Agent, or Firm*—Kolisch Hartwell, PC

(57) ABSTRACT

An apparatus for inputting information is disclosed. The apparatus includes a first sensor operably configured to be mounted on a user's thumb and a plurality of sensors operably configured to be mounted on the user's fingers, such that the user can move the user's thumb and/or fingers to cause contact between the first sensor and at least one of the plurality of sensors. The apparatus also includes an interface in communication with the first sensor and the plurality of sensors, the interface being operably configured to associate contact between the first sensor and sensors of the plurality of sensors with respective data items and to produce a data signal representing the data item. Frequently used data items are associated with sensors of the plurality of sensors located in positions on the user's fingers that permit ergonomically favorable conditions when causing the contact.

61 Claims, 9 Drawing Sheets

FOREIGN PATENT DOCUMENTS

| | | |
|---|---|---|
| GB | 2320315 A | 6/1998 |
| WO | WO 89/12858 | 12/1989 |
| WO | WO 97/37340 | 10/1997 |
| WO | WO 02/054214 A1 | 7/2002 |
| WO | WO 02/063600 | 8/2002 |
| WO | WO 2005/027356 | 3/2005 |

OTHER PUBLICATIONS

Pratt, Vaughan R., "Thumbcode: A Device-Independent Digital Sign Language," Department of Computer Science, Stanford University. Jul. 1998, available at http://www.boole.standord.edu/pub/thumbcode.pdf, 8 pp.

Wearables Central, entitled "Key-Glove, The cheapest wearable keyboard on earth," downloaded from www.eyetap.org/wearable/keyglove.html, dated Sep. 21, 1999 (3 pages).

Wirejunkie Resources, entitled "KeyGlove", downloaded from www.wirejunkie.com/resources/wearable/keyglove, dated 2000 (3 pages).

The Kitty Project, "Handy Touch-Typing" and misc. website pages, downloaded from www.kittytech.com, undated (7 pages).

Engineered Fibre Structures Ltd., "Innovations—Control Glove", downloaded from www.fibrestructures.com/innovations.html, dated 2006 (2 pages).

* cited by examiner

250

Left Hand: first thumb sensor 198

| Finger Sensor | Index | Middle | Ring | Small |
|---|---|---|---|---|
| 201 | Space | e | a | n |
| 202 | r | s | u | p |
| 203 | Period / ? | : / ; | ( / < | [ / { |
| 204 | | Back / \ | @ / & | J |
| 205 | k | | | % / \| |
| 206 | | | | |
| 207 | Num/Arrow | ALT | CTRL | z |

Right Hand: first thumb sensor 198

| Finger Sensor | Index | Middle | Ring | Small |
|---|---|---|---|---|
| 201 | Space | t | o | i |
| 202 | c | h | l | w |
| 203 | Comma / ! | " / ' | ) / > | ] / } |
| 204 | | # / $ | _ / ^ | Q |
| 205 | v | | | ` / ~ |
| 206 | | | | |
| 207 | Num/Arrow | ALT | CTRL | x |

Left Hand: second thumb sensor 200

| Finger Sensor | Index | Middle | Ring | Small |
|---|---|---|---|---|
| 201 | Backspace | d | f | g |
| 202 | Del | Tab | Home | |
| 203 | | | | |
| 204 | | | | |
| 205 | Up | Pg Down | | |
| 206 | Down | Pg Up | | |
| 207 | Shift | | | |

252

Right Hand: second thumb sensor 200

| Finger Sensor | Index | Middle | Ring | Small |
|---|---|---|---|---|
| 201 | Enter | m | y | b |
| 202 | Ins | Esc | End | |
| 203 | | | | |
| 204 | | | | |
| 205 | Left | | | |
| 206 | Right | | | |
| 207 | Shift | | | |

FIG. 6

| Finger Sensor | Left Hand: first thumb sensor 198 | | | | Right Hand: first thumb sensor 198 | | | |
|---|---|---|---|---|---|---|---|---|
| | Index | Middle | Ring | Small | Index | Middle | Ring | Small |
| 201 | 1 | 2 | 3 | 4 | Left | Up | Right | |
| 202 | 5 | 6 | 7 | 8 | + | - | / | * |
| 203 | | | | | = | | | |
| 204 | | | | | | | | |
| 205 | | | | | | | | |
| 206 | | | | | | | | |
| 207 | | | | | | | | |

| Finger Sensor | Left Hand: second thumb sensor 200 | | | | Right Hand: second thumb sensor 200 | | | |
|---|---|---|---|---|---|---|---|---|
| | Index | Middle | Ring | Small | Index | Middle | Ring | Small |
| 201 | | | | | | | | |
| 202 | | | | | | | | |
| 203 | | | | | | | | |
| 204 | 9 | F11 | | | | | | |
| 205 | 0 | F12 | | | | | | |
| 206 | | | | | | | | |
| 207 | Num/Arrow | | | | Function | | | |

FIG. 7

Left Hand: first thumb sensor 198

| Finger Sensor | Index | | Middle | | Ring | | Small |
|---|---|---|---|---|---|---|---|
| | Space | shift | e | ctrl | a | alt | n |
| 201 | r | | s | | u | | p |
| 202 | | | | | | | |
| 203 | Period | | ? | Comma | Comma | | ! |
| 204 | q | | v | | j | | k |
| 205 | @ | | d | | f | | g |
| 206 | : | | ( | | ) | | x |
| 207 | Num/Arrow | | | | | | z |

Right Hand: first thumb sensor 198

| Finger Sensor | Index | | Middle | | Ring | | Small |
|---|---|---|---|---|---|---|---|
| | Space | shift | t | ctrl | o | alt | l |
| 201 | c | | h | | i | | w |
| 202 | | | | | | | |
| 203 | Period | | ? | Comma | Comma | | ! |
| 204 | q | | v | | j | | k |
| 205 | @ | | m | | y | | b |
| 206 | : | | ( | | ) | | x |
| 207 | Num/Arrow | | | | | | z |

Left Hand: second thumb sensor 200

| Finger Sensor | Index | Middle | Ring | Small |
|---|---|---|---|---|
| 201 | Backspace | t | o | l |
| 202 | c | h | i | w |
| 203 | | m | y | b |
| 204 | Quotation | | | |
| 205 | Apostrophe | | | |
| 206 | Backslash | | | |
| 207 | Comb. | | | |

Right Hand: second thumb sensor 200

| Finger Sensor | Index | Middle | Ring | Small |
|---|---|---|---|---|
| 201 | Enter | e | a | n |
| 202 | r | s | u | p |
| 203 | | d | f | g |
| 204 | Quotation | | | |
| 205 | Apostrophe | | | |
| 206 | Backslash | | | |
| 207 | Comb. | | | |

FIG. 8

| Finger Sensor | Left Hand: first thumb sensor 198 | | | |
|---|---|---|---|---|
| | Index | Middle | Ring | Small |
| 201 | 0 | 1 | 2 | 3 |
| 202 | 4 | 5 | 6 | 7 |
| 203 | | * | # | |
| 204 | | | | End |
| 205 | 8 | | | |
| 206 | 9 | | | |
| 207 | Send | | | |

| Finger Sensor | Left Hand: second thumb sensor 200 | | | |
|---|---|---|---|---|
| | Index | Middle | Ring | Small |
| 201 | Speed Dial | Voice Mail | | |
| 202 | | | | |
| 203 | | | | |
| 204 | | | | |
| 205 | | | | |
| 206 | | | | |
| 207 | | | | |

FIG. 9

APPARATUS AND METHOD FOR INPUTTING INFORMATION

BACKGROUND OF THE INVENTION

1. Field of Invention

This invention relates generally to inputting information, and more particularly to an input apparatus and method for inputting information into an electronic device.

2. Description of Related Art

Recent years have seen a dramatic increase in mobile computing. Devices such as cellular telephones, audio and video devices, and many other electronic devices have become increasingly complex, while at the same being miniaturised for mobile use. Miniaturisation causes a problem for information entry into the devices, since such devices typically have very small keys that are generally difficult to operate. Attempts to address this problem have resulted in cellular telephones being provided with voice recognition capability and computing devices being provided with handwriting recognition capabilities. However, such devices are still awkward to use and user input is slow.

Some manufacturers have made portable keyboards available for use with their mobile devices. However such portable keyboards generally need to be supported on a surface and may leave the user feeling cramped for space. Some users may even develop health problems such as carpal tunnel syndrome due to using such keyboards in un-ergonomic positions.

There remains a need for methods and apparatus for inputting of information into electronic devices.

SUMMARY OF THE INVENTION

In accordance with one aspect of the invention there is provided an apparatus for inputting information. The apparatus includes a first sensor operably configured to be mounted on a user's thumb and a plurality of sensors operably configured to be mounted on the user's fingers, such that the user can move the user's thumb and/or fingers to cause contact between the first sensor and at least one of the plurality of sensors. The apparatus also includes an interface in communication with the first sensor and the plurality of sensors, the interface being operably configured to associate contact between the first sensor and sensors of the plurality of sensors with respective data items and to produce a data signal representing the data item. Frequently used data items are associated with sensors of the plurality of sensors located in positions on the user's fingers that permit ergonomically favourable conditions when causing the contact.

The frequently used data items may be associated with sensors of the plurality of sensors such that when the first sensor and ones of the sensors are in contact, the user's thumb and/or fingers are in ergonomically favourable positions.

The frequently used data items may be associated with sensors of the plurality of sensors, such that when moving the user's thumb and/or fingers to cause the contact, the user's thumb and/or fingers follow an ergonomically favourable path.

The frequently used data items may be associated with ones of the plurality of sensors, such that causing the contact includes a minimum of movement of the user's thumb and/or fingers when inputting a plurality of frequently used data items.

The interface may be operably configured to be mounted on the user's hand.

The apparatus may include a holder operably configured to fit over the user's thumb and fingers and the first sensor and the plurality of sensors may be disposed on the holder.

The interface may be mounted on the holder.

The holder may include a shaped covering.

The shaped covering may include a glove.

The plurality of sensors may be disposed on the holder such that at least some of the plurality of sensors are positioned on distal phalanges of the user's fingers when the holder is fitted on the user's hand, the frequently used data items being associated with ones of the plurality of sensors positioned on the distal phalanges.

The plurality of sensors may be disposed on the holder such that at least some of the plurality of sensors are positioned on middle phalanges of the user's ring and middle fingers when the holder is fitted on the user's hand, the frequently used data items being further associated with ones of the plurality of sensors positioned on the middle phalanges of the user's ring and middle fingers.

The plurality of sensors may be disposed on the holder such that at least some of the plurality of sensors are positioned on distal and middle phalanges on a side of the user's index finger when the holder is fitted on the user's hand, the frequently used data items being further associated with ones of the plurality of sensors positioned on the distal and middle phalanges on the side of the user's index finger.

The plurality of sensors may be disposed on the holder such that at least one of the plurality of sensors is positioned proximate a tip of a distal phalange of one of the user's fingers when the holder is fitted on the user's hand and at least one data item from the group consisting of "e", "a", "n", "t", "o", and "i" may be associated with the at least one of the plurality of sensors.

The plurality of sensors may be disposed on the holder such that at least one of the plurality of sensors is positioned on a palm side of the user's hand and spaced inwardly from a tip of a distal phalange when the holder is fitted on the user's hand and at least one data item from the group consisting of "s", "u", "p", "c", "h", "l", "r", and "w" may be associated with the at least one of the plurality of sensors.

The first sensor may be disposed on the holder such that the first sensor is positioned proximate a tip of the user's thumb when the holder is fitted on the user's hand.

The first sensor may be disposed on the holder such that the first sensor extends at least partway around a periphery of the tip when the holder is fitted on the user's hand.

The plurality of sensors may be disposed on the holder such that at least one of the plurality of sensors is positioned on a side of one of the user's fingers when the holder is fitted on the user's hand.

The plurality of sensors may be a first plurality of sensors, and the apparatus may further include a second plurality of sensors disposed on the holder in closely spaced relation such that the second plurality of sensors are positioned along a side of one of the user's fingers when the holder is fitted on the user's hand, the interface being operably configured to produce a repeating data signal in response to successive contact between adjacent ones of the second plurality of sensors and the first sensor.

The repeating data signal may be a first repeating data signal associated with successive contact between adjacent ones of the second plurality of sensors and the first sensor in a first direction, and the interface may be operably configured to associate a second repeating data signal with successive contact between adjacent ones of the second plurality of sensors and the first sensor in a second direction, the second direction being opposite to the first direction.

The first repeating data signal and the second repeating data signal may be representative of data items that are operable to cause a display to scroll up and down respectively.

The apparatus may include a mode sensor operably configured to produce a mode selection signal for reception by the interface and the interface may be configured to associate data items in a set of data items with respective ones of the plurality of sensors in response to receiving the mode selection signal.

The set of data items may include at least one of numeric data items, alphanumeric data items, data items corresponding to function keys and data items associated with actions.

The set of data items may include data items that are frequently used in conjunction with at least one of a computer program, a language, and an electronic device.

The apparatus may include a holder operably configured to fit over the user's thumb and fingers, the first sensor and the plurality of sensors being disposed on the holder and the set of data items may include data items associated with ones of the plurality of sensors positioned on at least one of the user's left hand and the user's right hand when the holder is fitted on the user's hand.

The mode sensor may include one of the plurality of sensors, and the mode signal may be produced in response to contact between the first sensor and the one of the plurality of sensors.

The mode sensor may include at least one actuator and the mode selection signal may be produced in response to actuation of the actuator by the user.

The apparatus may include a second sensor operably configured to be mounted on a palm side of a user's thumb in spaced apart relation to the first sensor, the interface being in communication with the second sensor and being operably configured to associate contact between the second sensor and sensors of the plurality of sensors with respective data items and to produce a data signal representing the data items.

The second sensor may include a shaped conductive strip, the shape configured to facilitate ergonomically favourable conditions when causing the contact.

The second sensor may include first and second conductive strips arranged in a "T" shape.

The second sensor may include first and second conductive strips arranged in a cruciform shape;

The interface may be operably configured to associate data items frequently occurring in a sequence in words associated with a particular language with adjacently positioned ones of the plurality of sensors.

The particular language may be the English language and the data items frequently occurring in the sequence may include at least one of the sequences of items "es", "er", "th", "ed", and "ng".

The interface may be operably configured to associate contact between the first sensor and two adjacently positioned ones of the plurality of sensors with a data item and to produce a data signal representing the data item. 4The data item may include at least one of a "shift" data item, a "ctrl" data item, an "alt" data item, and a data item that causes an action to be performed.

The interface may be operably configured to produce the data signal such that the data signal represents an ordered sequence of data items in response to contacting an assigned one of the plurality of sensors a number of times in succession, and then contacting sensors associated with the ordered sequence of data items.

The first sensor may include a first electrical contact point and the plurality of sensors may each include a respective electrical contact point and the first sensor and the plurality of sensors may be configured to complete an electrical circuit when the first electrical contact is in physical contact with at least one of the respective electrical contact points, and the interface may be operably configured to produce the data signal in response to sensing the completed electric circuit.

At least one of the plurality of sensors may include a pressure sensor in communication with the interface such that the interface produces the data signal in response to contact pressure being applied between the first sensor and the pressure sensor.

The interface may be operably configured to produce a signal for driving a transducer to generate one of tactile feedback and audible feedback to the user, the feedback confirming that a data-item has been sensed.

The apparatus may include a display in communication with the interface, the display being operably configured to display information to the user.

The apparatus may include a transmitter for transmitting the data signal to an electronic device.

The transmitter may include a radio frequency transmitter operable to transmit a radio frequency signal representing the data signal.

In accordance with another aspect of the invention there is provided an electronic device operably configured to receive the data signal from the above apparatus.

The electronic device may include one of a cellular telephone, a computing device, a vehicle mounted device, an audio device, and a video device.

In accordance with another aspect of the invention there is provided an apparatus for inputting information. The apparatus includes a first sensor operably configured to be mounted on a user's thumb and a plurality of sensors operably configured to be mounted on the user's fingers such that the user can move the user's thumb and/or fingers to cause contact between the first sensor and at least one of the plurality of sensors. The apparatus also includes provisions for associating contact between the first sensor and the plurality of sensors with respective data items such that frequently used data items are associated with sensors of the plurality of sensors located in positions on the user's fingers that permit ergonomically favourable conditions when causing the contact. The apparatus further includes provisions for producing a data signal representing the data item.

The apparatus may further include provisions for mounting the provisions for producing the data signal on the user's hand.

The apparatus may include provisions for mounting the first sensor and the plurality of sensors on the user's hand, the provisions being configured to fit over the user's thumb and fingers.

The apparatus may include provisions for producing a mode selection signal and the provisions for associating may include provisions for associating data items in a set of data items with respective ones of the plurality of sensors in response to receiving the mode selection signal.

The apparatus may include a second sensor operably configured to be mounted on a palm side of a user's thumb in spaced apart relation to the first sensor and the provisions for associating may be operably configured to associate contact between the second sensor and the plurality of sensors with respective data items.

The first sensor may include a first electrical contact point and the plurality of sensors may each include a respective electrical contact point and the first sensor and the plurality of sensors may be configured to complete an electrical circuit when the first electrical contact is in physical contact with at least one of the respective electrical contact points, and the provisions for producing the data signal are operably configured to produce the data signal in response to sensing the completed electric circuit.

The apparatus may include provisions for producing a signal for driving a transducer to generate one of tactile feedback and audible feedback to the user, the feedback confirming that a data-item has been sensed.

The apparatus may include provisions for transmitting the data signal to an electronic device.

The provisions for transmitting may include provisions for transmitting a radio frequency signal representing the data signal.

In accordance with another aspect of the invention there is provided in a system including a first sensor operably configured to be mounted on a user's thumb and a plurality of sensors operably configured to be mounted on the user's fingers such that the user can move the user's thumb and/or fingers to cause contact between the first sensor and at least one of the plurality of sensors, a method of producing a signal representing contact between the first sensor and at least one of the plurality of sensors. The method involves associating contact between the first sensor and the plurality of sensors with respective data items such that frequently used data items are associated with sensors of the plurality of sensors located in positions on the user's fingers that permit ergonomically favourable conditions when causing the contact. The method further involves producing a data signal representing the data item.

The method may involve producing a mode selection signal and associating may involve associating data items in a set of data items with respective ones of the plurality of sensors in response to receiving the mode selection signal.

Producing the data signal may involve transmitting a radio frequency signal representing the data signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 6 is a table of associations between data items and sensors shown in FIG. 4;

FIG. 7 is a table of associations between data items and sensors shown in FIG. 4, in accordance with an alternate embodiment;

FIG. 8 is a table of associations between data items and sensors shown in FIG. 4, in accordance with an alternate embodiment; and FIG. 9 is a table of associations between data items and sensors shown in FIG. 4, in accordance with an alternate embodiment.

DETAILED DESCRIPTION

Figure 1:
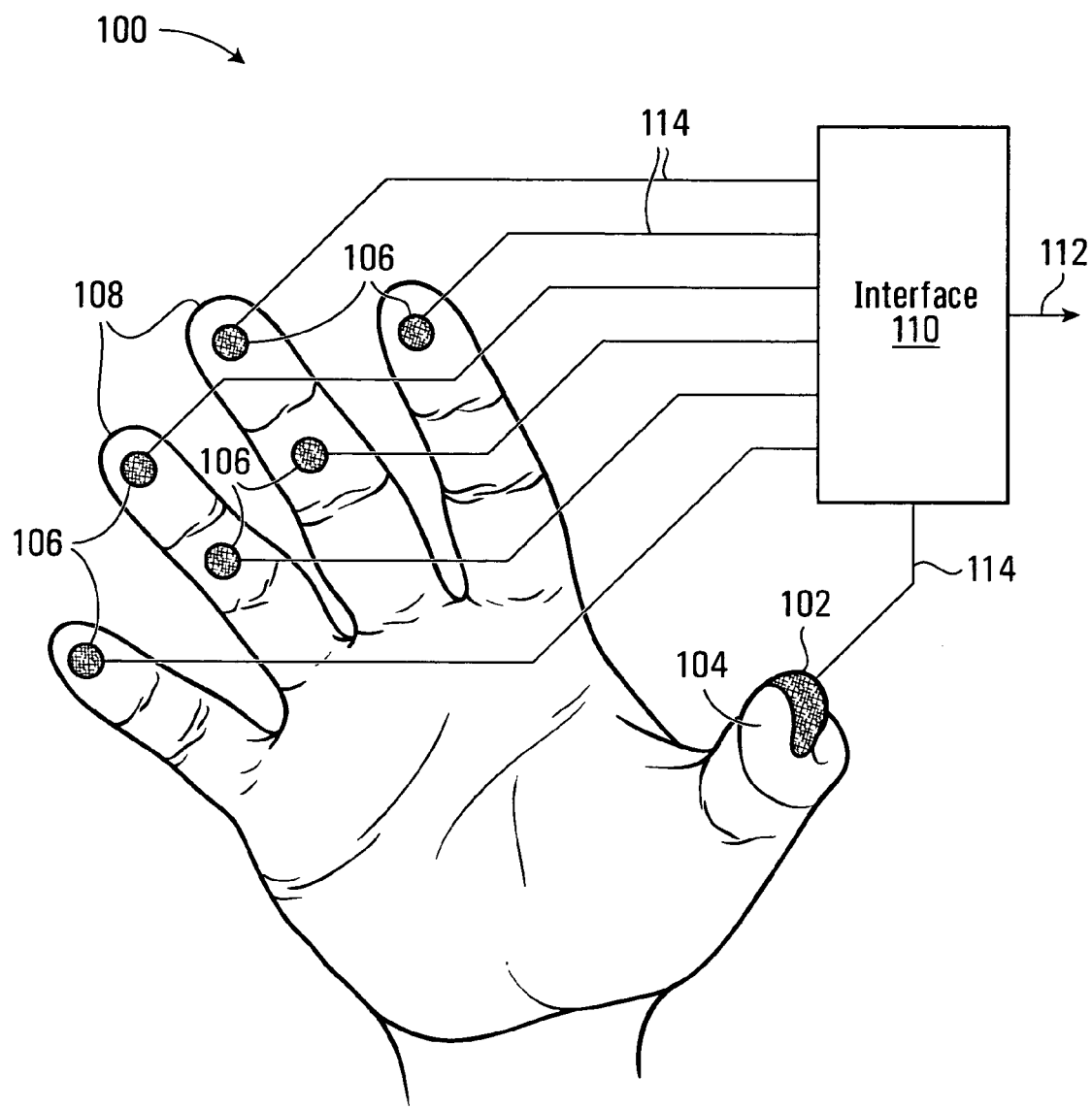
FIG. 1 is a perspective view of an apparatus for inputting information according to a first embodiment of the invention.

Referring to FIG. 1, an apparatus for inputting information according to a first embodiment of the invention is shown generally at 100. The apparatus 100 includes a first sensor 102 which is operably configured to be mounted on a user's thumb 104 and a plurality of sensors 106 operably configured to be mounted on the user's fingers 108, such that the user can move the user's thumb and/or fingers to cause contact between the first sensor and at least one of the plurality of sensors. The apparatus 100 also includes an interface 110 in communication with the first sensor 102 and the plurality of sensors 106. The interface 110 is operably configured to associate contact between the first sensor 102 and sensors of the plurality of sensors 106 with respective data items. The interface 110 further includes an output 112 for producing a data signal representing the data item, such that frequently used data items are associated with sensors of the plurality of sensors 106 located in positions on the user's fingers that permit ergonomically favourable conditions when causing the contact.

The data item may include a numeric, punctuation, or alphanumeric data character, or a code corresponding to a function key (the keys F1-F12 provided on an extended computer keyboard are one example of a function key). The data item may also include symbols (e.g. "@", "#", and "5") or may cause some action to occur such as an "Enter" key on a computer, or a "send" key on a cellular telephone, for example. The data signal representing the data item may be encoded with a code that is received and interpreted by an associated device, which then performs some action in response to receiving the code.

Figure 2:
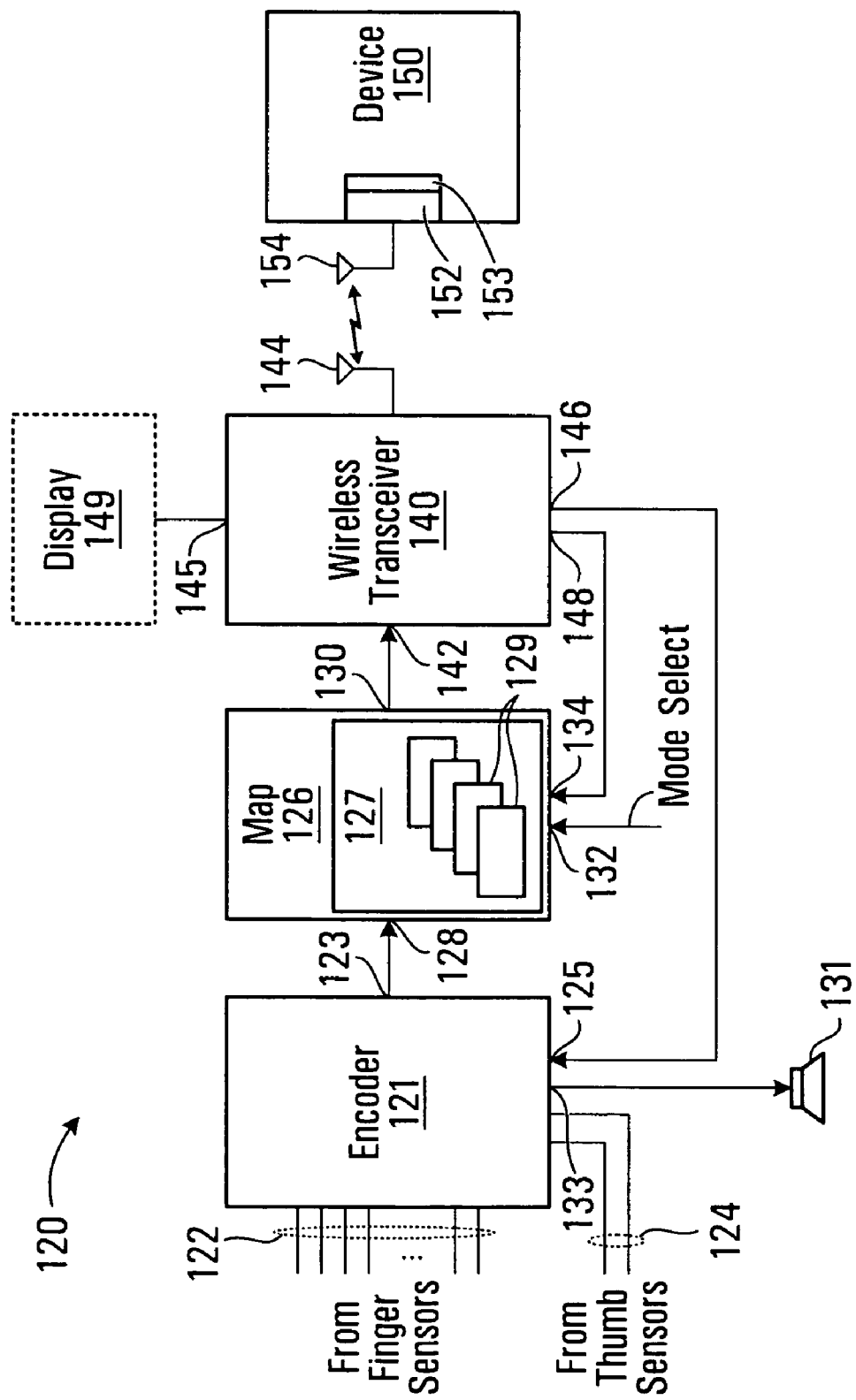
FIG. 2 is a schematic diagram of an embodiment of an interface shown in FIG. 1.

Referring to FIG. 2, an embodiment of the interface 110 is shown at 120. The interface 120 includes an encoder 121, which includes a plurality of inputs 122, each one of the inputs corresponding to one of the plurality of sensors 106 on the user's fingers 108. The encoder 121 also includes at least one input 124, for receiving signals from the sensor 102 positioned on the user's thumb 104. In some embodiments a second sensor (not shown in FIG. 1) may be positioned on the user's thumb, in which case the input 124 would also include a second input for receiving signals from the second sensor. The encoder 121 also includes an input 125 for receiving configuration commands and data for configuring the encoder.

Referring back to FIG. 1, in one embodiment the sensors 106 and 104 each include conductive electrical contact points, each connected to a respective one of the inputs 122 and 124 by a plurality of conductors 114.

Referring again to FIG. 2, the encoder 121 produces a signal at the output 123, in response to sensing a completed electrical circuit between one of the sensors 106 and the first sensor 102 when the sensors are brought into physical contact by the user. The signal at the output 123 includes a code that uniquely identifies which one of the sensors 106 was contacted by the sensor 102.

In one embodiment the interface 120 includes a transducer 131 and the encoder 121 includes an output 133 for producing a signal in response to each sensing of contact between one of the sensors 106 and the sensor 102. The signal at the output 133 is in communication with the transducer 131 for providing audible or tactile feedback to the user. For example, the transducer 131 may produce a "beep" or "click" sound. Alternatively, the transducer may be positioned in close proximity to the user's hand and may produce a vibration or other disturbance that can be felt by the user. The audible or tactile feedback serves to confirm to the user that a data-item has been sensed.

The interface 120 further includes a map 126, which has an input 128 for receiving the signal from the output 123 of the encoder 121, and an output 130 for producing the data signal. The map 126 also includes an input 132 for receiving a mode selection signal, and an input 134 for receiving configuration commands and data for configuring the map. The map further includes a memory 127, such as a non-volatile flash memory device, for storing one or more association tables 129. The map 126 is operable to associate contact between the first sensor 102 and sensors 106 with data items in accordance with the association table 129 in the memory 127, and to produce the data signal representing the data item.

The interface 120 further includes a wireless transceiver 140, which has an input 142 for receiving the data signal from the output 130 of the map 126. The wireless transceiver 140 also includes an antenna 144, for producing a radio frequency signal representing the data signal and for receiving radio frequency signals representing configuration data and commands from a device 150. The wireless transceiver 140 further includes an output 148 for providing configuration commands and data to the input 134 of the map 126, and an output 146 for providing configuration commands and data to the input 125 of the encoder 121.

The wireless transmitter 140 may optionally include an output 145 which is in communication with a display 149 such as a liquid crystal display device (LCD) for displaying information to the user.

The interface 120 is in wireless communication with the device 150. The device 150 may be an electronic device including, but not limited to, a cellular telephone, a handheld computing device such as a Personal Digital Assistant (PDA), a laptop or desktop computer, a vehicle mounted device such as a car stereo, an audio device such as an MP3 player, and a video device such as a DVD player. The device 150 includes a wireless transceiver 152, which includes an antenna 154 for receiving the radio frequency signal representing the data signal from the wireless transceiver 140, and for transmitting the radio frequency signals representing configuration data and commands to the wireless transceiver 140. The device 150 further includes an input interface 153 in communication with the wireless transceiver 152 for receiving the data signal from the wireless transceiver. In one embodiment the input interface 153 may include a keyboard port or a universal serial bus (USB) port.

In other embodiments, communication between the device 150 and the interface 120 may not involve configuration data and commands being sent to the apparatus by the device, in which case the interface 120 may include a wireless transmitter, instead of the wireless transceiver 140, and the device 150 may include a wireless receiver, instead of the wireless transceiver 152.

In one embodiment the wireless transceivers 140 and 152 are implemented as Bluetooth® wireless devices. Alternatively the wireless transceivers 140 and 152 may be implemented as Universal Serial Bus (USB) wireless transceivers, which use ultra wide band communications to reduce power consumption of wireless devices. In other embodiments the wireless transceivers 140 and 152 may be eliminated and replaced by a wired connection to the device 150, such as a Universal Serial Bus (USB) cable and USB interface.

In other embodiments the device 150 may include an infrared port for receiving user input from an infrared transmitter and the wireless transceivers 140 and 152 may be implemented as infrared devices, which communicate by transmitting and receiving encoded infrared light signals.

Figure 3:
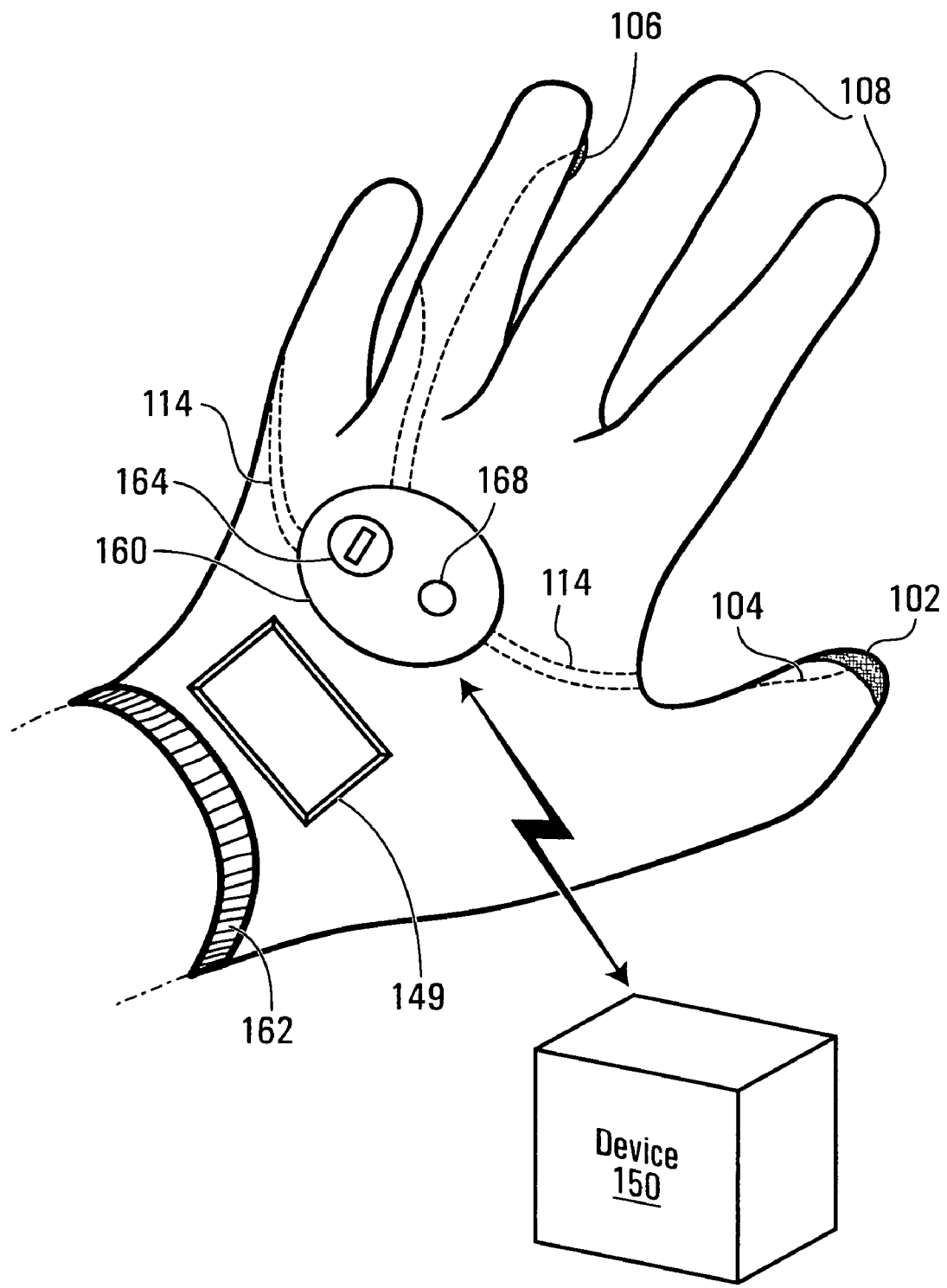
FIG. 3 is a perspective view of a housing for the interface shown in FIG. 2.

Referring to FIG. 3, in one embodiment the interface 120 is mounted in a housing 160, which further includes a battery compartment 164, for receiving a battery (not shown) that provides power to the encoder 121, the map 126, and the wireless transceiver 140. In this embodiment the housing 160, and the sensors 102 and 106 are mounted on a shaped covering such as a glove 162 shown generally at 162, such that when the glove is worn by the user, the housing is positioned on the back of the user's hand and the sensors are located in ergonomically favourable positions on the user's thumb 104 and fingers 108. Optionally, the glove 162 may also include the display 149, mounted on the glove such that when the glove is fitted on the user's hand, the display is positioned on the back of the hand. The glove 162 may be fabricated from a material that is breathable and stretchable, for example. The material may also be transparent or semi-transparent or may be a meshed fabric to make it lighter. The glove 162 also includes the conductors 114 connecting the sensors 102 and 106 to the interface 120. The conductors 114 may include flexible conductive traces that may be routed inside or outside the glove 162. Alternatively, the housing 160 and sensors 102 and 106 may be mounted on any other shaped covering that is adapted to fit on the user's hand.

In another embodiment the housing 160 may include a charging port (not shown) for receiving electrical energy supplied externally to the housing and for providing energy to recharge the battery.

The operation of the interface 120 is described in reference to FIGS. 1 and 2. Referring to FIG. 1, desired data items to be input are selected by the user by contact between the sensor 102 on the thumb 104 and one of the sensors 106 on the fingers. This completes an electric circuit between one of the inputs 122 and one of the inputs 124 on the encoder 121. The encoder 121 activates each of the inputs 122 and senses when a particular circuit is completed, which indicates that a particular one of the sensors 106 has been activated. The encoder 121 then produces the signal encoded with a code representing the selected one of the sensors 106 at the output 123.

When the user completes a circuit between one of the sensors 106 and the sensor 102, there is usually a small amount of vibration between the surfaces which results in the circuit being repeatedly completed, and then disconnected in a short time. This fluctuation is known as "bounce" and the encoder 121 includes a filter (not shown) that de-bounces the circuit, such that the contacting is treated as a single data item. The device 150 may optionally produce configuration commands and data for configuring the filter, which are transmitted by the transceiver 152 to the transceiver 140 and received at the input 125. Other configuration commands and data may also be received at the input 125 of the encoder 121, for example, configuration data corresponding to common keyboard configuration parameters such as typematic repeat rate etc.

The signal produced by the encoder 121 at the output 123 uniquely identifies one of the sensors 106, which has been selected, but does not necessarily associate the sensor with a particular data item. In this embodiment the association is performed by the map 126 which receives the signal from the output 123 of the encoder 121 at the input 128. The signal produced at the output 123 is encoded with data indicating which of the sensors 106 has been contacted. The map 126 looks up an associated data item corresponding to the sensor, in the association table 129 stored in the memory 127. Advantageously, by not permanently associating certain sensors with specific data items, the sensors may be re-configured for different applications or devices.

The association table 129 in the map 126 is configured when a configuration command signal is received at the input 134, followed by data signals representing data items that are to be associated with particular sensors 106. The data signals are received at the input 134 of the map 126 and the association data is stored in the association table 129 in the memory 127. In this embodiment, the memory 127 is large enough to store a plurality of association tables 129, and the map 126 is responsive to the mode selection signal at the input 132 to select one of the plurality of association tables 129 to be active. One of the sensors 106 may be configured to cause the mode selection signal to be generated when contacted by the first sensor 102. Alternatively, the apparatus may include a mode selection actuator switch 168, shown in FIG. 3 in communication with the map 126, which may be activated by the user to cause the map to select an association table or mode.

In another embodiment the mode selection signal is generated by activating one of a plurality of mode selector switches (not shown), each of the plurality of mode selector switches corresponding to one of the plurality of association tables 129. Advantageously, the mode selection signal allows the user to conveniently switch between different modes, which are suitable for particular electronic devices, specific activities, or specific software programs running on an electronic device.

The map 126 produces a data signal at the output 130, which is received at the input 142 by the wireless transceiver 140. The wireless transceiver produces a radio frequency signal representing the data signal at the antenna 144. The radio frequency signal is received at the antenna 154 of the transceiver 152, and the data signal is recovered from the radio frequency signal, and sent to the input interface 153.

The display 149, when included, may be configured to display information received from the device 150 via the wireless link. The display 149 may simply echo data items or may display other information provided by the device 150.

Figure 4:
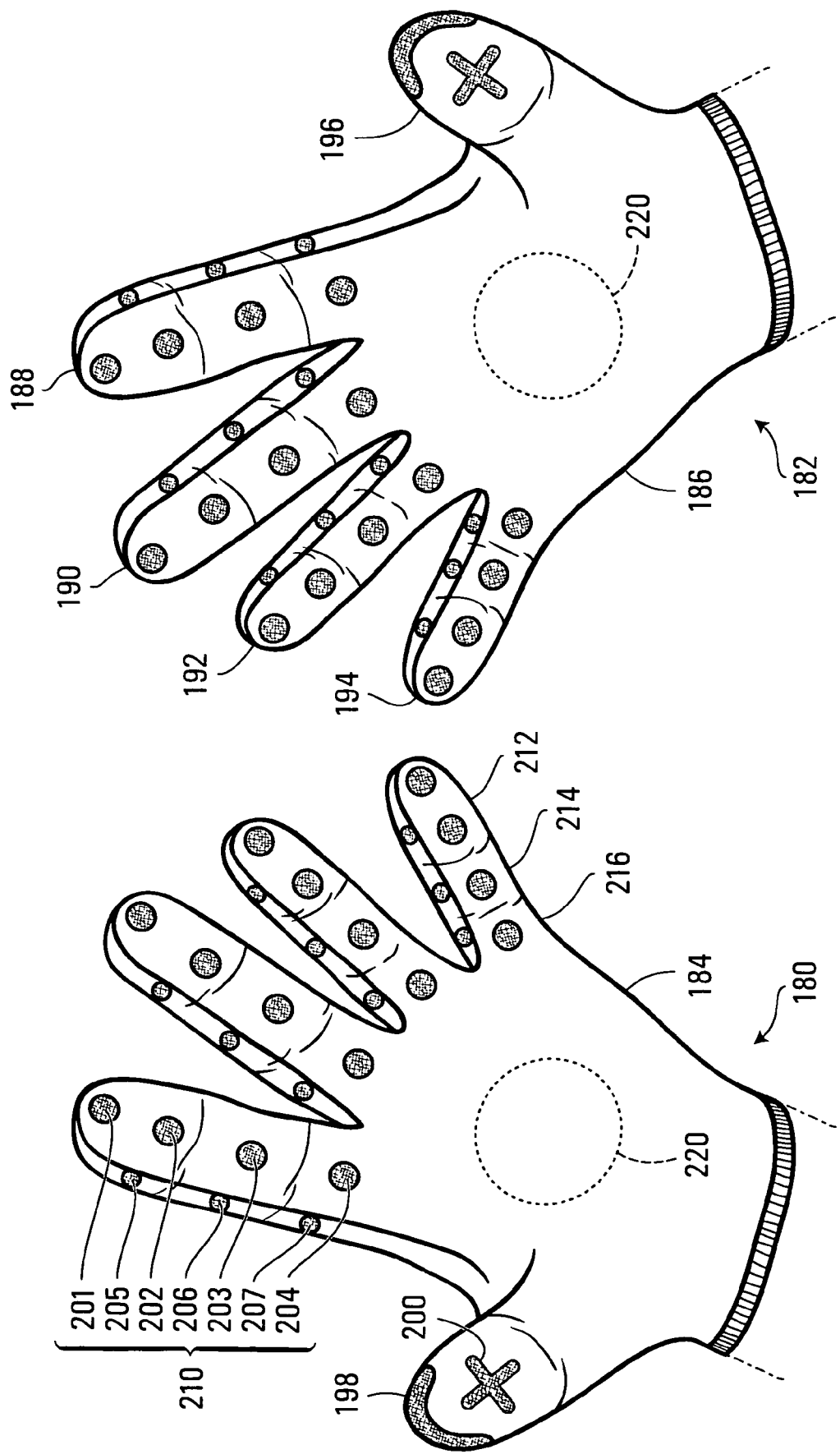
FIG. 4 is a perspective view of an apparatus for inputting information according to a second embodiment of the invention.

Referring to FIG. 4, in a second embodiment of the invention, both the user's left hand 180 and the user's right hand 182 are used to input information. In this embodiment a first glove 184 is adapted to fit the user's left hand 180 and a second glove 186 is adapted to fit the user's right hand 182. The gloves 184 and 186 include shaped coverings that conform to the user's index fingers 188, middle fingers 190, ring fingers 192, and small fingers 194. The gloves 184 and 186 further include shaped coverings that conform to the user's thumbs 196, for each of the gloves respectively.

Each glove 184 and 186 includes a first sensor 198 mounted on the gloves such that when fitted on the user's hands, the first sensor will be positioned on a tip of the user's thumbs 196 respectively. Similarly, a second sensor 200 is positioned spaced inwardly from the tip of the user's thumbs 196 respectively.

Each glove 184 and 186 further includes a plurality of finger sensors 210 mounted on the gloves such that when fitted on the user's hands, the sensors will be positioned on the user's fingers 188-194. The plurality of finger sensors 210 includes finger sensors 201-207. For sake of clarity the finger sensors, thumb sensors, user's fingers, and the phalanges of the user's fingers are commonly numbered for each finger on the user's hands 180 and 182.

The plurality of finger sensors 210 includes a sensor 201 positioned on the gloves 184 and 186 to be adjacent to a tip of a distal phalange 212, a sensor 202 positioned on the gloves to be spaced inwardly from the tip of the user's distal phalange, a sensor 203 positioned on the gloves to be on a middle phalange 214, and a sensor 204 positioned on the gloves to be on a proximate phalange 216, all on a palm side of the user's hands 180 and 182, respectively. The plurality of finger sensors 210 further includes a sensor 205 positioned on the gloves 184 and 186 to be on a side of the distal phalange 212, a sensor 206 positioned on the gloves to be on a side of the middle phalange 214, and a sensor 207 positioned on the gloves to be on a side of the proximate phalange 216, of the user's hands 180 and 182, respectively.

In this embodiment the plurality finger sensors 210 include conductive electrical contact points. The first sensors 198 each include a conductive strip and when the gloves 184 and 186 are fitted on the user's hands the conductive strips extend partway around a periphery of the tip of the user's thumbs 196 respectively. The second sensor 200 includes a conductive area shaped in the form of a cross. Alternatively, the second sensor 200 may be shaped in the form of a "T". Advantageously the shaped first and second sensors 198 and 200 facilitate ergonomically favourable conditions when contacting the plurality of sensors 201-207 with the first and second sensors. Each of the sensors 201-207 is connected to one of the inputs 122 of the encoder 121, shown in FIG. 2. The first and second sensors 198 and 200 are each connected to one of the inputs 124 of the encoder 121. In this embodiment each of the gloves 184 and 186 include an interface housing 220 mounted on the gloves such that when the glove is worn by the user, the housing is positioned on the back of the user's hand as shown in FIG. 3.

The sensor 201 and the sensor 202, on each of the user's fingers 188-194 are positioned such that movement of the user's thumbs 196 and/or fingers to bring the first sensor 198 into contact with the sensors 201 and 202 is easily accomplished without discomfort to the user. Accordingly the map 126 is configured such that the most frequently used data items are associated with contact between the first sensor 198 and the sensors 201 and 202 on each of the user's fingers thus permitting ergonomically favourable conditions when the sensors are in contact and when moving the user's thumb and/or fingers to perform the contact between the sensors.

Similarly, the sensor 201, on each of the user's fingers is ergonomically favourably positioned for contacting by the second sensor 200. Accordingly the map 126 is configured such that further frequently used data items are associated with contact between the second sensor 200 and the sensor 201 on each of the user's fingers. Each of the plurality of sensors 210 may thus be associated with two different data items, depending on whether they are contacted by the first sensor 198 or the second sensor 200.

The sensor 205, on the side of the user's index fingers 188 and small fingers 194 are also somewhat ergonomically favourably positioned for contacting by the first sensor 198. Accordingly the map 126 is configured such that some frequently used data items are associated with contact between the first sensor 198 and the sensor 205 on the side of the user's index fingers 188 and small fingers 194.

Some of the plurality of sensors 210 may be very difficult to contact with either the first sensor 198 and/or the second sensor 200. For example most users will find contacting the second sensor 200 with any of the sensors 203 and 204, to be quite uncomfortable and therefore these sensors are not considered to be ergonomically favourable positioned, an thus may only be used for infrequently used data items, or not used at all.

Advantageously, in associating sensors in ergonomically favourable positions with frequently used data items, hand movement is kept to a minimum when inputting information, thus reducing user fatigue and enabling the user to input information at a higher rate.

Figure 5:
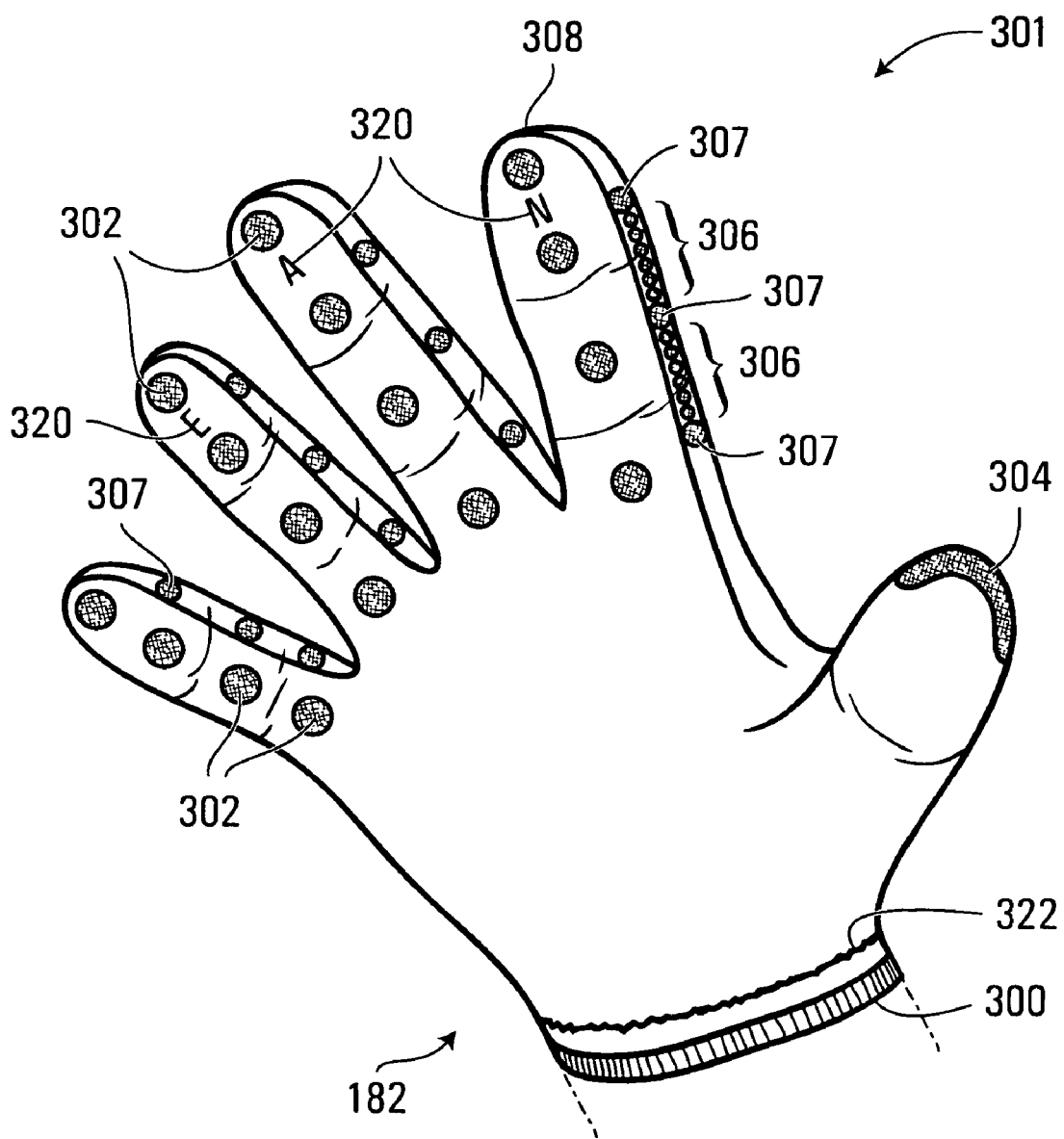
FIG. 5 is a perspective view of an apparatus for inputting information according to a third embodiment of the invention.

In other embodiments, other types of sensors may be used, such as pressure sensitive sensors, touch sensors, thermal or capacitive sensors etc. Referring to FIG. 5, a third embodiment of the invention is shown generally at 301. In this embodiment, the users right hand 182 or left hand (only a right hand is shown in FIG. 5), is used to mimic the operation of a wheel on a wheel mouse or other similar input device. The user's hand 182 is covered by a glove 300, which includes a first plurality of sensors including sensors 302 mounted on the palm side of the glove, and sensors 307 mounted on the glove such that when the glove is worn on the user's hand, the sensors 307 are disposed on the sides of the user's fingers. The glove 300 also includes a first sensor 304. The sensors 302, 307 and 304 operate in a similar fashion as the plurality of sensors 210, and the first sensor 198, described above in reference to FIG. 4.

The glove 300 further includes a second plurality of sensors 306 mounted on a side of the glove such that when the glove is worn by the user the sensors will be disposed on the user's index finger 308, positioned in-between the sensors 307. The plurality of sensors 306 are positioned in closely spaced relation and each sensor includes a conductive electrical contact point, which is in communication with one of the inputs 122 of the encoder 121 shown in FIG. 2.

In this embodiment an area of each sensor 306 is smaller than an area of the sensors 307.

In this embodiment the second plurality of sensors 306 is used to implement functionality similar to the wheel on the wheel mouse, by sliding the first sensor 304 down the side of the user's index finger 308, thus successively contacting adjacent ones of the second plurality of sensors 306 with the first sensor. The encoder 121 and map 126 are configured to produce a repeating data signal in response to each successive contact. The encoder 121 is configured to ignore contact of the sensors 307 on the user's index finger 308, when successive contacting of adjacent ones in the second plurality of sensors 306 is detected.

Alternatively the encoder 121 may be configured to produce a first repeating data signal when contacted by the first sensor 304 in a first direction, and a second repeating signal when contacted by the first sensor in a second direction, opposite to the first direction. The first and second repeating data signals provide signals that mimic the operation of the wheel on the wheel mouse. Such a repeating data signal may be used to cause a display, in an associated device to scroll up and down or to select an item from a list of items.

Referring to FIG. 5, in one embodiment the glove 300 may be marked with symbols or letters 320 indicating specific associations between the sensors 302 and data items. Advantageously, the symbols or letters may be applied to a transparent covering 322, such as a vinyl or latex glove, which can be pulled over the glove 300 such that a user can temporarily have access to a visual association between sensors and data items while learning how to use the apparatus 301. In embodiments where the first sensor and the plurality of sensors include electrical contact points, the transparent covering would require correspondingly positioned holes to provide access to the contacts.

The following describes modes of operation of the apparatus, which may be activated by changing the mode select signal provided to the input 132 of the map 126 shown in FIG. 2.

Two Handed Input Mode

An embodiment for inputting information into an associated device using both of the user's hands 180 and 182 is described with reference to FIG. 4 and FIG. 6. Referring to FIG. 6, one possible association of data items with finger sensors 201-207, for contact with the first sensors 198 is shown in the table at 250. For example, contacting between the first sensor 198 on the thumb 196 of the left hand, and the finger sensor 201 on the ring finger, produces a data item "a". Contacting between the first sensor 198 on the thumb 196 of the right hand, and the finger sensor 202 on the index finger, produces a data item "c". Similarly, one possible association of data items with finger sensors 201-207, for contact with the second sensors 200 is shown in the table at 252.

Advantageously, for the association shown in FIG. 6 and when inputting text characters in the English language, approximately 57% of the text characters commonly include the data items "space", "e", "a, "n", "t", "o", and "i", and are thus associated with contacting between the first sensors 198 and the finger sensors 201 adjacent the finger tips. Approximately 25% of the text characters commonly include the data items "r", "s", "u", "p", "c", "h", "l", "r", and "w", which are thus associated with contacting between the first sensor 198 and the finger sensors 202 positioned spaced inwardly from the finger tip. A further 10% of the text characters commonly include the data items "Backspace", "d", "f", "g", "Enter", "m", "y", and "b", which are associated with contacting between the second sensors 200 and the finger sensors 201 adjacent the finger tips. A further 1% of text characters commonly include the data items "k" and "v", which are associated with contacting between the first sensors 198 and certain ones of the finger sensors 205 positioned adjacent the sides of the user's finger tips.

Consequently, in this embodiment approximately 93% of data items may be input by contacting either the first sensor 198 or the second sensor 200 with one of sensors 201, 202, and 205, which are ergonomically favourably positioned on the distal phalanges of the user's fingers. Other less frequently used data items may be associated with less ergonomically positioned sensors. In general, the ergonomics of contacting any of the plurality of sensors 210 and the first or second sensors 198 and 200 may vary slightly between users. For example a user who plays an instrument such as a guitar, which conditions the fingers to awkward movements, may find some less ergonomic sensors of the plurality of sensors 210 to be easily contactable, while a person with mild arthritis may find the same sensor impossible to contact.

Further, by contacting the second sensor 200 and the finger sensor 207, the apparatus may be placed in a "shifted" mode, whereby uppercase characters and alternate characters may be accessed (e.g. the sensor 203, on the left hand "Peroid/?" causes the interface 110 to produce a period when in the un-shifted mode, and to produce a "?" when in the shifted mode).

Advantageously with the association shown in FIG. 6, data items frequently occurring in sequence in words associated with a particular language may be associated with adjacently positioned sensors. For example, "e" and "s" are associated with sensors 201 and 202 on the middle finger of the left hand. Similarly, "e" and "r" are associated with sensor 201 on the middle finger and sensor 202 on the index finger of the left hand respectively. Further "t and "h are associated with sensors 201 and 202 on the middle finger of the right hand. The data items "n" and "g" are both associated with the sensor 201 on the small finger of the right hand, and are selected by first contacting the sensor 201 with the first sensor 198 and then the second sensor 200. The data items "e" and "d" are both associated with the sensor 201 on the middle finger of the right hand, and are selected by first contacting the sensor 201 with the first sensor 198 and then the second sensor 200. Advantageously, these and other frequently used sequences of data items may be inputted in a single sliding movement between the above identified adjacently positioned sensors.

Numeric Input Mode

An embodiment for inputting numeric information is described with reference to FIG. 4 and FIG. 7. In this embodiment numeric information is input using the user's left hand 180 for numbers 1-9, and the user's right hand for other data items usually located on a numeric keypad. The numeric input mode may be activated from the two handed input mode described above, by contacting the first sensor 198 and the finger sensor 207 on the user's left hand index finger.

In the numeric input mode, contacting the second sensor 200 and the finger sensor 207 on the user's right hand index finger activates a function key mode, in which each number key becomes a corresponding function key (i.e. "1" becomes "F1", "5" becomes "F5" etc), except for "F11" and "F12", which are associated as shown in FIG. 7.

Contacting the second sensor 200 and the finger sensor 207 on the user's left hand middle finger returns the user to the mode described in the two handed input mode embodiment above.

Single Handed Input Mode

An embodiment for single handed input is described with reference to FIG. 4 and FIG. 8, and illustrates a mode for inputting information into an associated device using only one of the user's left hand 180 and the user's right hand. In FIG. 8, associations for each of the user's left and right hands are shown, although it should be understood that the user will choose one or the other, in accordance with the user's preference.

In the single handed mode, not all characters usually found on a keyboard are made available. The single handed mode may be particularly useful for inputting information into an associated device which is customized for messaging applications such as email.

The single handed mode may provide access to a numeric entry mode, such as that shown in FIG. 7, which is activated by contacting the first sensor 198 and the finger sensor 207 on the index finger.

In this embodiment, the "shifted" mode may be accessed by contacting between the first sensor 198 and two of the sensors 210 on adjacent fingers simultaneously. For example, the sensors 201 on the index and middle fingers 188 and 190 may be associated with placing the apparatus in the shifted mode. Other data items such as the control key and the alt key may be associated with other sensors located on adjacent fingers, e.g. the sensors 201 on the middle and ring fingers 190 and 192, and the sensors 201 on the ring and small fingers 192 and 194.

Some data items require inputting three key combinations in an ordered sequence e.g. "ctrl-alt-del", which may be difficult to input using a single hand (or even with two hands). In this embodiment, the encoder 121 is configured to receive ordered sequences in response to contacting the sensor 207 on the index finger 188 three times in quick succession with the second sensor 200. The map 126 includes entries corresponding to valid combinations of data items and the map produces a data signal corresponding to the desired combination for the following three data items that are input by the user.

Dial Mode

An embodiment for inputting dialling information into an associated device, such as a cellular telephone is described with reference to FIG. 4 and FIG. 9. In this embodiment the user's left hand 180 is used for input, although either hand could be used. The dial mode is similar to the numeric input mode embodiment above, but has additional data items such as "send" and "end", commonly found on cellular telephones, associated with index finger sensor 207 and small finger sensor 204. Other data items may be associated with finger sensors 201 on the index finger and middle fingers respectively of the left hand, which are operable to activate speed dial and voice mail modes of operation of the cellular telephone.

While specific embodiments of the invention have been described and illustrated, such embodiments should be considered illustrative of the invention only and not as limiting the invention as construed in accordance with the accompanying claims.

What is claimed is:

1. An apparatus for inputting information, the apparatus comprising:
a first sensor operably configured to be mounted proximate a tip of a user's thumb;
a plurality of sensors operably configured to be mounted on the user's fingers, such that the user can move the user's thumb and/or fingers to cause contact between said first sensor and at least one of said plurality of sensors, wherein at least one of the plurality of sensors is positioned proximate a tip of a distal phalange of one of the user's fingers, wherein at least one of the plurality of sensors is positioned on a side of one of the user's fingers, and wherein at least one of the plurality of sensors is positioned on a distal phalange of one of the user's fingers, on a palm side of the user's hand and spaced inwardly from the tip of the distal phalange; and
an interface in communication with said first sensor and said plurality of sensors, said interface being operably configured to associate contact between said first sensor and sensors of said plurality of sensors with respective data items and to produce data signals representing said data items, such that frequently used data items are associated with the contacts between said first sensor and the sensors of said plurality of sensors which are positioned proximate the tips of the distal phalanges of the user's fingers, which are positioned on the sides of the user's fingers, and which are positioned on the distal phalanges of the user's fingers, on the palm side of the user's hand and spaced inwardly from the tips of the distal phalanges.

2. The apparatus of claim 1 wherein said interface is operably configured to be mounted on the user's hand.

3. The apparatus of claim 1 wherein said interface is operably configured to produce a data signal such that said data signal represents an ordered sequence of data items in response to contacting an assigned one of said plurality of sensors a number of times in succession, and then contacting sensors associated with said ordered sequence of data items.

4. The apparatus of claim 1 wherein said first sensor comprises a first electrical contact point and wherein said plurality of sensors each comprises a respective electrical contact point and wherein said first sensor and said plurality of sensors are configured to complete an electrical circuit when said first electrical contact is in physical contact with at least one of said respective electrical contact points, and wherein said interface is operably configured to produce a data signal in response to sensing said completed electric circuit.

5. The apparatus of claim 1 wherein at least one of said plurality of sensors comprises a pressure sensor in communication with said interface such that said interface produces a data signal in response to contact pressure being applied between said first sensor and said pressure sensor.

6. The apparatus of claim 1 wherein said interface is operably configured to produce a signal for driving a transducer to generate one of tactile feedback and audible feedback to the user, said feedback confirming that a data item has been sensed.

7. The apparatus of claim 1 further comprising a display in communication with said interface, said display being operably configured to display information to the user.

8. The apparatus of claim 1 wherein said interface is operably configured to associate data items frequently occurring in a sequence in words associated with a particular language with adjacently positioned ones of said plurality of sensors.

9. The apparatus of claim 8 wherein said particular language comprises the English language and wherein said data items frequently occurring in said sequence comprise at least one of the sequences of items "es", "er", "th", "edt", and "ng".

10. The apparatus of claim 1 wherein said interface is operably configured to associate contact between said first sensor and two adjacently positioned ones of said plurality of sensors with a data item and to produce a data signal representing said data item.

11. The apparatus of claim 10 wherein said data item comprises at least one of a "shift" data item, a "ctrl" data item, an "alt" data item, and a data item that causes an action to be performed.

12. The apparatus of claim 1 further comprising a transmitter for transmitting said data signals to an electronic device.

13. The apparatus of claim 12 wherein said transmitter comprises a radio frequency transmitter operable to transmit a radio frequency signal representing said data signals.

14. An electronic device operably configured to receive said data signals from the apparatus of claim 1.

15. The apparatus of claim 14 wherein the electronic device comprises one of a cellular telephone, a computing device, a vehicle mounted device, an audio device, and a video device.

16. The apparatus of claim 1 further comprising a mode sensor operably configured to produce a mode selection signal for reception by said interface and wherein said interface is configured to associate data items in a set of data items with respective ones of said plurality of sensors in response to receiving said mode selection signal.

17. The apparatus of claim 16 wherein said set of data items comprises at least one of:
   numeric data items;
   alphanumeric data items;
   data items corresponding to function keys; and
   data items associated with actions.

18. The apparatus of claim 16 wherein said set of data items comprises data items that are frequently used in conjunction with at least one of a computer program, a language, and an electronic device.

19. The apparatus of claim 16 further comprising a holder operably configured to fit over the user's thumb and fingers, said first sensor and said plurality of sensors being disposed on said holder and wherein said set of data items comprises data items associated with ones of said plurality of sensors positioned on at least one of the user's left hand and the user's right hand when said holder is fitted on the user's hand.

20. The apparatus of claim 16 wherein said mode sensor comprises one of said plurality of sensors, and wherein said mode signal is produced in response to contact between said first sensor and said one of said plurality of sensors.

21. The apparatus of claim 16 wherein said mode sensor comprises at least one actuator and said mode selection signal is produced in response to actuation of said actuator by the user.

22. The apparatus of claim 1 further comprising a second sensor operably configured to be mounted on a palm side of the user's thumb in spaced apart relation to said first sensor, said interface being in communication with said second sensor and being operably configured to associate contact between said second sensor and sensors of said plurality of sensors with respective data items and to produce data signals representing said data items, such that frequently used data items are associated with the contacts between said second sensor and the sensors of said plurality of sensors which are positioned proximate the tips of the distal phalanges of the user's fingers, which are positioned on the distal phalanges on the sides of the user's fingers, and which are positioned on the distal phalanges of the user's fingers, on the palm side of the user's hand and spaced inwardly from the tips of the distal phalanges.

23. The apparatus of claim 22 wherein said second sensor comprises a shaped conductive strip, said shape configured to facilitate ergonomically favorable conditions when causing said contact.

24. The apparatus of claim 22 wherein said second sensor comprises first and second conductive strips arranged in a "T" shape.

25. The apparatus of claim 22 wherein said second sensor comprises first and second conductive strips arranged in a cruciform shape.

26. The apparatus of claim 22 wherein the at least one of the plurality of sensors which is positioned on a side of one of the user's fingers is comprised of one of the plurality of sensors being positioned on the side of the distal phalange of the user's index finger.

27. The apparatus of claim 22 wherein the at least one of the plurality of sensors which is positioned on a side of one of the user's fingers is comprised of one of the plurality of sensors being positioned on the side of the middle phalange of the user's index finger.

28. The apparatus of claim 26 wherein the at least one of the plurality of sensors which is positioned on a side of one of the user's fingers is further comprised of one of the plurality of sensors being positioned on the side of the middle phalange of the user's index finger.

29. The apparatus of claim 1 wherein the at least one of the plurality of sensors which is positioned proximate a tip of a distal phalange of one of the user's fingers is comprised of one of the plurality of sensors being positioned proximate the tip of the distal phalange of the user's index finger and one of the plurality of sensors being positioned proximate the tip of the distal phalange of the user's middle finger.

30. The apparatus of claim 29 wherein the at least one of the plurality of sensors which is positioned on a side of one of the user's fingers is comprised of one of the plurality of sensors being positioned on the side of the distal phalange of the user's index finger.

31. The apparatus of claim 30 wherein the at least one of the plurality of sensors which is positioned on a distal phalange of one of the user's fingers, on a palm side of the user's hand and spaced inwardly from the tip of the distal phalange is comprised of one of the plurality of sensors being positioned on the distal phalange of the user's middle finger, on a palm side of the user's hand and spaced inwardly from the tip of the distal phalange.

32. The apparatus of claim 31 wherein the at least one of the plurality of sensors which is positioned proximate a tip of a distal phalange of one of the user's fingers is further comprised of one of the plurality of sensors being positioned proximate the tip of the distal phalange of the user's ring finger.

33. The apparatus of claim 32 wherein the at least one of the plurality of sensors which is positioned proximate a tip of a distal phalange of one of the user's fingers is further comprised of one of the plurality of sensors being positioned proximate to the tip of the distal phalange of the user's small finger.

34. The apparatus of claim 32 wherein the at least one of the plurality of sensors which is positioned on a side of one of the user's fingers is further comprised of one of the plurality of sensors being positioned on the side of the middle phalange of the user's index finger.

35. The apparatus of claim 32 wherein the at least one of the plurality of sensors which is positioned on a distal phalange of one of the user's fingers, on a palm side of the user's hand and spaced inwardly from the tip of the distal phalange is further comprised of one of the plurality of sensors being positioned on the distal phalange of the user's ring finger, on a palm side of the user's hand and spaced inwardly from the tip of the distal phalange.

36. The apparatus of claim 32 wherein the at least one of the plurality of sensors which is positioned on a side of one of the user's fingers is further comprised of one of the plurality of sensors being positioned on the side of the distal phalange of the user's middle finger.

37. The apparatus of claim 32 wherein the at least one of the plurality of sensors which is positioned on a side of one of the user's fingers is further comprised of one of the plurality of sensors being positioned on the side of the distal phalange of the user's ring finger.

38. The apparatus of claim 1 further comprising a holder operably configured to fit over the user's thumb and fingers and wherein said first sensor and said plurality of sensors are disposed on said holder.

39. The apparatus of claim 38 wherein said interface is mounted on said holder.

40. The apparatus of claim 38 wherein said holder comprises a shaped covering.

41. The apparatus of claim 40 wherein said shaped covering comprises a glove.

42. The apparatus of claim 38 wherein said plurality of sensors are disposed on said holder such that at least some of said plurality of sensors are positioned on middle phalanges of the user's ring and middle fingers when said holder is fitted on the user's hand, said frequently used data items being further associated with ones of said plurality of sensors positioned on said middle phalanges of the user's ring and middle fingers.

43. The apparatus of claim 38 wherein said plurality of sensors are disposed on said holder such that at least some of said plurality of sensors are positioned on distal and middle phalanges on a side of the user's index finger when said holder is fitted on the user's hand, said frequently used data items being further associated with ones of said plurality of sensors positioned on said distal and middle phalanges on said side of the user's index finger.

44. The apparatus of claim 38 wherein said plurality of sensors are disposed on said holder such that at least one of said plurality of sensors is positioned proximate a tip of a distal phalange of one of the user's fingers when said holder is fitted on the user's hand and wherein at least one data item from the group consisting of "e", "a", "n", "t", "o", and "i" is associated with said at least one of said plurality of sensors.

45. The apparatus of claim 38 wherein said plurality of sensors are disposed on said holder such that at least one of said plurality of sensors is positioned on a palm side of the user's hand and spaced inwardly from a tip of a distal phalange when said holder is fitted on the user's hand and wherein at least one data item from the group consisting of "s", "u", "p", "c", "h", "l", "r", and "w" is associated with said at least one of said plurality of sensors.

46. The apparatus of claim 38 wherein said first sensor is disposed on said holder such that said first sensor extends at least partway around a periphery of said tip when said holder is fitted on the user's hand.

47. The apparatus of claim 38 wherein said plurality of sensors comprises a first plurality of sensors, and further comprising a second plurality of sensors disposed on said holder in closely spaced relation such that said second plurality of sensors are positioned along a side of one of the user's fingers when said holder is fitted on the user's hand, said interface being operably configured to produce a repeating data signal in response to successive contact between adjacent ones of said second plurality of sensors and said first sensor.

48. The apparatus of claim 47 wherein said repeating data signal comprises a first repeating data signal associated with successive contact between adjacent ones of said second plurality of sensors and said first sensor in a first direction, and wherein said interface is operably configured to associate a second repeating data signal with successive contact between adjacent ones of said second plurality of sensors and said first sensor in a second direction, said second direction being opposite to said first direction.

49. The apparatus of claim 48 wherein said first repeating data signal and said second repeating data signal are representative of data items that are operable to cause a display to scroll up and down respectively.

50. An apparatus for inputting information, the apparatus comprising:
   a first sensor operably configured to be mounted proximate a tip of a user's thumb;
   a plurality of sensors operably configured to be mounted on the user's fingers such that the user can move the user's thumb and/or fingers to cause contact between said first sensor and at least one of said plurality of sensors, wherein at least one of the plurality of sensors is positioned proximate a tip of a distal phalange of one of the user's fingers, wherein at least one of the plurality of sensors is positioned on a side of one of the user's fingers, and wherein at least one of the plurality of sensors is positioned on a distal phalange of one of the user's fingers, on a palm side of the user's hand and spaced inwardly from the tip of the distal phalange;
   means for associating contact between said first sensor and said plurality of sensors with respective data items such that frequently used data items are associated with the contacts between said first sensor and the sensors of said plurality of sensors which are positioned proximate the tips of the distal phalanges of the user's fingers, which are positioned on the sides of the user's fingers, and which are positioned on the distal phalanges of the user's fingers, on the palm side of the user's hand and spaced inwardly from the tips of the distal phalanges; and
   means for producing a data signals representing said data items.

51. The apparatus of claim 50 further comprising means for mounting said means for producing said data signals on the user's hand.

52. The apparatus of claim 50 further comprising means for mounting said first sensor and said plurality of sensors on the user's hand, said means being configured to fit over the user's thumb and fingers.

53. The apparatus of claim 50 further comprising means for producing a mode selection signal and wherein said means for associating comprises means for associating data items in a set of data items with respective ones of said plurality of sensors in response to receiving said mode selection signal.

54. The apparatus of claim 50 further comprising a second sensor operably configured to be mounted on a palm side of the user's thumb in spaced apart relation to said first sensor, and wherein said means for associating is operably configured to associate contact between said second sensor and said plurality of sensors with respective data items and to produce data signals representing said data items, such that frequently used data items are associated with the contacts between said second sensor and the sensors of said plurality of sensors which are positioned proximate the tips of the distal phalanges of the user's fingers, which are positioned on the distal phalanges on the sides of the user's fingers, and which are positioned on the distal phalanges of the user's fingers, on the palm side of the user's hand and spaced inwardly from the tips of the distal phalanges.

55. The apparatus of claim 50 wherein said first sensor comprises a first electrical contact point and wherein said plurality of sensors each comprises a respective electrical contact point and wherein said first sensor and said plurality of sensors are configured to complete an electrical circuit when said first electrical contact is in physical contact with at least one of said respective electrical contact points, and wherein said means for producing said data signals are operably configured to produce said data signals in response to sensing said completed electric circuit.

56. The apparatus of claim 50 further comprising means for producing a signal for driving a transducer to generate one of tactile feedback and audible feedback to the user, said feedback confirming that a data item has been sensed.

57. The apparatus of claim 50 further comprising means for transmitting said data signals to an electronic device.

58. The apparatus of claim 57 wherein said means for transmitting comprises means for transmitting a radio frequency signal representing said data signals.

59. In a system comprising a first sensor operably configured to be mounted proximate a tip of a user's thumb and a plurality of sensors operably configured to be mounted on the user's fingers such that the user can move the user's thumb and/or fingers to cause contact between said first sensor and at least one of said plurality of sensors, wherein at least one of the plurality of sensors is positioned proximate a tip of a distal phalange of one of the user's fingers, wherein at least one of the plurality of sensors is positioned on a side of one of the user's fingers, and wherein at least one of the plurality of sensors is positioned on a distal phalange of one of the user's fingers, on a palm side of the user's hand and spaced inwardly from the tip of the distal phalange, a method of producing a data signal from contact between said first sensor and one of said plurality of sensors, the method comprising:
  associating contact between said first sensor and said plurality of sensors with respective data items such that frequently used data items are associated with the contacts between said first sensor and the sensors of said plurality of sensors which are positioned proximate the tips of the distal phalanges of the user's fingers, which are positioned on the sides of the user's fingers, and which are positioned on the distal phalanges of the user's fingers, on the palm side of the user's hand and spaced inwardly from the tips of the distal phalanges;
  providing the contact between said first sensor and the one of said plurality of sensors, wherein the one of said plurality of sensors is positioned proximate the tip of the distal phalange of one of the user's fingers, is positioned on the side of one of the user's fingers, or is positioned on the distal phalange of one of the user's fingers, on the palm side of the user's hand and spaced inwardly from the tips of the distal phalanges;
  producing the data signal representing one of said frequently used data items.

60. The method of claim 59 further comprising producing a mode selection signal and wherein said associating comprises associating data items in a set of data items with respective ones of said plurality of sensors in response to receiving said mode selection signal.

61. The method of claim 59 wherein producing said data signal comprises transmitting a radio frequency signal representing said data signal.

* * * * *

UNITED STATES PATENT AND TRADEMARK OFFICE
CERTIFICATE OF CORRECTION

PATENT NO. : 7,498,956 B2  Page 1 of 1
APPLICATION NO. : 11/326029
DATED : March 3, 2009
INVENTOR(S) : Brent Michael Baier and Leslie Howard Messmer It is certified that error appears in the above-identified patent and that said Letters Patent is hereby corrected as shown below:

On the Title page, at Field (73), delete "Llyodminster" and insert --Lloydminster-- therefor.

Column 3, line 55, delete "4The" and insert --The-- therefor.

Column 15, line 21, claim 9, delete "edt" and insert --ed-- therefor.

Signed and Sealed this

Fifteenth Day of June, 2010

David J. Kappos
*Director of the United States Patent and Trademark Office*